(12) United States Patent
Yang et al.

(10) Patent No.: US 12,515,898 B2
(45) Date of Patent: Jan. 6, 2026

(54) METHOD FOR ADJUSTING FLATNESS OF PLANES

(71) Applicant: InnoLux Corporation, Miao-Li County (TW)

(72) Inventors: De-Heng Yang, Miao-Li County (TW); Chien-Cheng Cha, Miao-Li County (TW); Chia-Che Chang, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 230 days.

(21) Appl. No.: 18/511,913

(22) Filed: Nov. 16, 2023

(65) Prior Publication Data

US 2024/0199352 A1  Jun. 20, 2024

(30) Foreign Application Priority Data

Dec. 16, 2022 (CN) .......................... 202211629270.X

(51) Int. Cl.
   *B25J 9/16*    (2006.01)
   *B65G 61/00*   (2006.01)

(52) U.S. Cl.
   CPC ............ *B65G 61/00* (2013.01); *B25J 9/1628* (2013.01)

(58) Field of Classification Search
   CPC ......... B65G 61/00; B25J 9/1628; B23P 19/10
   See application file for complete search history.

(56) References Cited

FOREIGN PATENT DOCUMENTS

| CN | 109261577 A | 1/2019 | |
|----|-------------|--------|--|
| CN | 112123342 A | * 12/2020 | ............ B65G 61/00 |
| CN | 112539717 A | 3/2021 | |
| CN | 114908328 A | 8/2022 | |

\* cited by examiner

*Primary Examiner* — Dylan M Katz
(74) *Attorney, Agent, or Firm* — MUNCY, GEISSLER, OLDS & LOWE, P.C.

(57) ABSTRACT

A method for adjusting flatness of planes is provided. The method includes steps of: providing a pick-and-place mechanism including a distance sensor and a pick-and-place plane; using the distance sensor to measure a first distance between the pick-and-place mechanism and a reference plane in a first direction; using the distance sensor to measure a second distance between the pick-and-place mechanism and the reference plane in a direction opposite to the first direction; calculating a first compensation degree according to the first distance and the second distance; and adjusting flatness between the pick-and-place plane and the reference plane with the first compensation degree.

20 Claims, 6 Drawing Sheets

METHOD FOR ADJUSTING FLATNESS OF PLANES

CROSS-REFERENCE TO RELATED APPLICATIONS

This application claims the benefits of the Chinese Patent Application Serial Number 202211629270.X, filed on Dec. 16, 2022, the subject matter of which is incorporated herein by reference.

BACKGROUND

Field of the Disclosure

The present disclosure relates to the technical field of adjusting flatness of planes.

Description of Related Art

At present, automated manufacturing equipment is widely used in the manufacturing process of electronic products, such as using a pick-and-place mechanism to assemble the display panel to form an electronic product. When different components of an electronic product are stacked and assembled, if the flatness of the components is not in consistency, there will be an interval distance between two components after stacking, which may affect the quality of the final product. At present, the flatness adjustment of the pick-and-place mechanism often depends on the operator's own experience and naked eyes, so that there is more time required to adjust the flatness, and/or the error rate is high.

Therefore, it is desired to provide an improved method for adjusting flatness of planes so as to mitigate and/or obviate the aforementioned problems.

SUMMARY

The present disclosure provides a method for adjusting flatness of planes. The method comprises the steps of: providing a pick-and-place mechanism, wherein the pick-and-place mechanism includes a distance sensor and a pick-and-place surface; using the distance sensor to measure a first distance between the pick-and-place mechanism and a reference plane in a first direction; using the distance sensor to measure a second distance between the pick-and-place mechanism and the reference plane in a direction opposite to the first direction; using the first distance and the second distance to calculate a first compensation angle; and adjusting flatness between the pick-and-place surface and the reference plane with the first compensation angle.

Other novel features of the disclosure will become more apparent from the following detailed description when taken in conjunction with the accompanying drawings.

DETAILED DESCRIPTION OF EMBODIMENT

Figure 1:
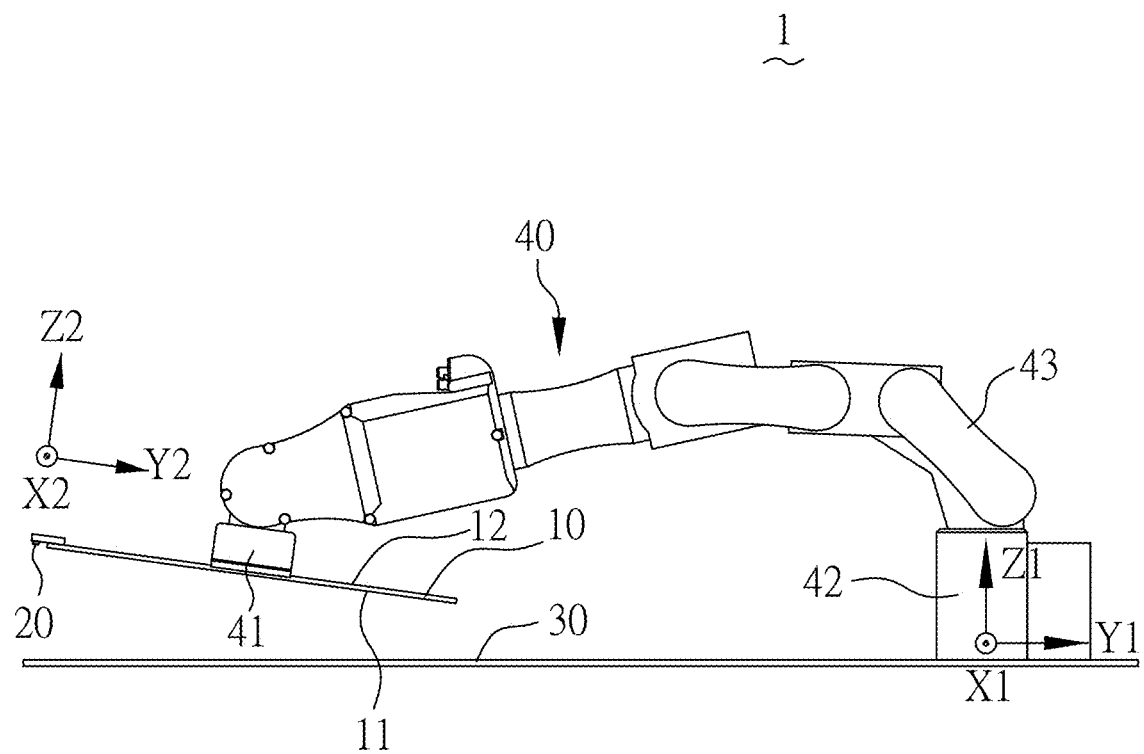
FIG. 1 is a schematic diagram of an assembling device according to an embodiment of the present disclosure.

Reference will now be made in detail to exemplary embodiments of the present disclosure, examples of which are illustrated in the accompanying drawings. Wherever possible, the same reference numerals are used in the drawings and description to refer to the same or like parts.

Throughout the specification and the appended claims, certain terms may be used to refer to specific components. Those skilled in the art will understand that electronic device manufacturers may refer to the same components by different names. The present disclosure does not intend to distinguish between components that have the same function but have different names. In the following description and claims, words such as "containing" and "comprising" are open-ended words, and should be interpreted as meaning "including but not limited to".

Directional terms mentioned in the specification, such as "up", "down", "front", "rear", "left", "right", etc., only refer to the directions of the drawings. Accordingly, the directional term used is illustrative, not limiting, of the present disclosure. In the drawings, various figures illustrate the general characteristics of methods, structures and/or materials used in particular embodiments. However, these drawings should not be construed to define or limit the scope or nature encompassed by these embodiments. For example, the relative sizes, thicknesses and positions of various layers, regions and/or structures may be reduced or enlarged for clarity.

One structure (or layer, component, substrate) described in the present disclosure is disposed on/above another structure (or layer, component, substrate), which can mean that the two structures are adjacent and directly connected, or can refer to two structures that are adjacent rather than directly connected. Indirect connection means that there is at least one intermediate structure (or intermediate layer, intermediate component, intermediate substrate, intermediate space) between the two structures, the lower surface of one structure is adjacent to or directly connected to the upper surface of the intermediate structure, and the upper surface of the other structure is adjacent to or directly connected to the lower surface of the intermediate structure. The intermediate structure may be a single-layer or multi-layer physical structure or a non-physical structure, which is not limited. In the present disclosure, when a certain structure is arranged "on" other structures, it may mean that a certain structure is "directly" on other structures, or it means that a certain structure is "indirectly" on other structures; that is, at least one structure is sandwiched, in between a certain structure and other structures.

The terms, such as "about", "equal to", "equal" or "same", "substantially", or "substantially", are generally interpreted as within 20% of a given value or range, or as within 10%, 5%, 3%, 2%, 1%, or 0.5% of a given value or range.

Furthermore, any two values or directions used for comparison may have certain errors. If the first value is equal to the second value, it implies that there may be an error of about 10% between the first value and the second value. If the first direction is perpendicular or "substantially" perpendicular to the second direction, the angle between the first direction and the second direction may be between 80 degrees and 100 degrees. If the first direction is parallel or "substantially" parallel to the second direction, the angle between the first direction and the second direction may be between 0 degrees and 10 degrees.

In the specification and claims, unless otherwise specified, ordinal numbers, such as "first" and "second", used herein are intended to distinguish elements rather than disclose explicitly or implicitly that names of the elements bear the wording of the ordinal numbers. The ordinal numbers do not imply what order an element and another element are in terms of space, time or steps of a manufacturing method. Thus, what is referred to as a "first element" in the specification may be referred to as a "second element" in the claims.

Furthermore, the term "a given range is from a first value to a second value" or "a given range is within a range from the first value to the second value" means that the given range includes the first value, the second value and other values therebetween.

In addition, the assembling device of the present disclosure may be used to assemble at least two electronic components or modules to manufacture an electronic device. The electronic device may include a display device, a backlight device, an antenna device, a sensing device, a tiled device, a touch display device, a curved display device or a free shape display device, but it is not limited thereto. The assembling device may assemble at least part of the electronic components through the pick-and-place mechanism, but it is not limited thereto. The electronic device may include, for example, liquid crystal, light emitting diode, fluorescence, phosphor, other suitable display media, or a combination thereof, but it is not limited thereto. The display device may be a non-self-luminous display device or a self-luminous display device. Electronic devices may include electronic components. Electronic components may include passive components and active components, such as capacitors, resistors, inductors, diodes, transistors, and the like. The diode may include a light-emitting diode (LED) or a photodiode. The light-emitting diodes may include, for example, organic light-emitting diodes (OLEDs), sub-millimeter light-emitting diodes (mini LEDs), micro light-emitting diodes (micro LEDs) or quantum dot light-emitting diodes (quantum dot LEDs), but it is not limited to. The antenna device may be a liquid crystal type antenna device or a non-liquid crystal type antenna device, and the sensing device may be a sensing device for sensing capacitance, light, thermal energy or ultrasonic waves, but it is not limited thereto. The tiled device may be, for example, a display tiled device or an antenna tiled device, but it is not limited thereto. It is noted that the electronic device may be any permutation and combination of the aforementioned, but it is not limited thereto. In addition, the electronic device may be a bendable or flexible electronic device. It is noted that the electronic device may be any permutation and combination of the aforementioned, but it is not limited thereto. In addition, the shape of the electronic device may be rectangular, circular, polygonal, with curved edges, or other suitable shapes. The electronic device may have peripheral systems such as a drive system, a control system, a light source system, a shelf system, etc. to support a display device, an antenna device or a tiled device.

It should be understood that, according to the disclosed embodiments, an optical microscope (OM), a scanning electron microscope (SEM), a film thickness profilometer (α-step), an ellipsometer thickness gauge, or other suitable means may be used to measure the depth, thickness, width or height of each component, or the spacing or distance between components. According to some embodiments, a scanning electron microscope may be used to obtain a cross-sectional structure image including the components to be measured, and measure the depth, thickness, width or height of each component, or the spacing or distance between components.

It should be noted that the following embodiments may be replaced, reorganized, and mixed to complete other embodiments without departing from the spirit of the present disclosure. As long as the features of the various embodiments do not violate the spirit of the present disclosure or conflict with each other, they can be mixed and matched arbitrarily.

Unless otherwise defined, all terms (including technical and scientific terms) used herein have the same meaning as commonly understood by one of ordinary skill in the art to which this disclosure belongs. It may be understood that these terms, such as those defined in commonly used dictionaries, should be interpreted as having meanings consistent with the background or context of the related technology and the present disclosure, and should not be interpreted in an idealized or overly formal manner, unless otherwise specified in the embodiments of the present disclosure.

In addition, the term "adjacent" in the specification and claims is used to describe mutual proximity, and does not necessarily mean mutual contact.

In addition, the descriptions such as "when" or "during" in the present disclosure represent aspects such as "now, before or after", and are not limited to situations that occur at the same time, which is described first here. In the present disclosure, similar descriptions such as "arranged on" refer to the corresponding positional relationship between the two components, and do not limit whether there is contact between the two components, unless otherwise specified, which is described here first. Furthermore, when the present disclosure discloses multiple functions, if the word "or" is used between the functions, it means that the functions may exist independently, but it does not exclude that multiple functions may exist simultaneously.

In some embodiments of the present disclosure, terms such as "connection" and "interconnection" about joining and connecting, unless otherwise specified, may mean that two structures are in direct contact, or may also mean that two structures are not in direct contact, where other structures are placed between the two structures. Moreover, the terms about joining and connecting may also include the situation that both structures are movable, or both structures are fixed. In addition, the term "couple" includes any direct and indirect means of electrical connection.

For the convenience of description, the electronic device will be described below as a display device, but the present disclosure is not limited thereto.

FIG. 1 is a schematic diagram of an assembling device 1 according to an embodiment of the present disclosure. The assembling device 1 may be used to stack a first object (not shown) on a second object (not shown), wherein the first object may be flatly attached to the second object, and the second object may be placed on a reference plane 30. The reference surface 30 is, for example, the surface of an optical table, but it is not limited thereto. The assembling device 1 is described below with a first coordinate system and a second coordinate system. The first coordinate system includes an X1 axis, an Y1 axis and a Z1 axis, wherein the X1 axis and the Y1 axis may be parallel to the reference plane 30, and the Z1 axis may be parallel to a normal direction of the reference plane 30. The second coordinate system includes an X2 axis, a Y2 axis and a Z2 axis, wherein the X2 axis is defined to be parallel to the X1 axis, and the Z2 axis may be parallel to a normal line on a pick-and-place surface 11 of the pick-and-place mechanism 10 of the assembling device 1. In one embodiment, the directions of the X1 axis, the Y1 axis and the Z1 axis in the first coordinate system may be perpendicular to each other, but it is not limited thereto. In one embodiment, the directions of the X2 axis, the Y2 axis and the Z2 axis in the second coordinate system may be perpendicular to each other, but it is not limited thereto.

As shown in FIG. 1, the assembling device 1 may include a pick-and-place mechanism 10 and a robotic arm 40, wherein the pick-and-place mechanism 10 is fixed to the robotic arm 40. In one embodiment, the pick-and-place mechanism 10 may pick up the first object (not shown) through vacuum suction, but it is not limited thereto. The pick-and-place mechanism 10 may have a pick-and-place surface 11, which is a plane capable of being connected to the first object. The reference surface 30 may be a plane on which the second object is placed, and the reference surface 30 may be larger than the pick-and-place surface 11 of the pick-and-place mechanism 10. In one embodiment, the robotic arm 40 may include a rotation part 41, a base 42 and at least one connection part 43, wherein the connection part 43 connects the base 42 and the rotation part 41, but it is not limited thereto. The rotation part 41 may be connected with the pick-and-place mechanism 10. The base 42 of the robotic arm 40 may be arranged on and fixed to the reference plane 30. Alternatively, the base 42 may also be arranged on a horizontal plane, wherein the horizontal plane may be parallel to the reference plane 30, and at a level different from that of the reference plane 30 (for example, the two planes correspond to different positions on the Z1 axis). Therefore, the X1 axis and the Y1 axis of the first coordinate system may be parallel to the base 42. The pick-and-place mechanism 10 may be displaced horizontally and/or vertically by the rotation part 41 and the connection part 43 of the robotic arm 40, so as to achieve tasks such as picking up or placing the first object. In one embodiment, the base 42 may rotate around the Z1 axis of the first coordinate system or, when the rotation part 41 rotates, since the rotation part 41 is connected to the pick-and-place mechanism 10, the pick-and-place surface 11 may rotate around the Z2 axis of the second coordinate system, but it is not limited thereto. In one embodiment, the origin of the first coordinate system may be, for example, the bottom of the base 42, but it is not limited thereto. In one embodiment, the origin of the second coordinate system may be, for example, the center of the pick-and-place mechanism 10 (or the center of the pick-and-place surface 11), but it is not limited thereto. In one embodiment, the center of an object may be the intersection of two diagonals of a smallest rectangle containing the object.

In the following, taking the display device including a panel module and a backlight module as an example, the first object may be a panel module, and the second object may be a backlight module, but it is not limited thereto. Since the flatness between the pick-and-place surface 11 of the pick-and-place mechanism 10 and the reference surface 30 may be not in consistency, for example, the two surfaces are on different horizontal planes, it is likely to generate interval distances when the pick-and-place mechanism 10 attaches the panel module to the backlight module, resulting in the problem of light leakage that cause a decrease in the quality of the product.

Therefore, it is necessary to adjust the flatness between the pick-and-place surface 11 of the pick-and-place mechanism 10 and the reference plane 30.

Figure 2:
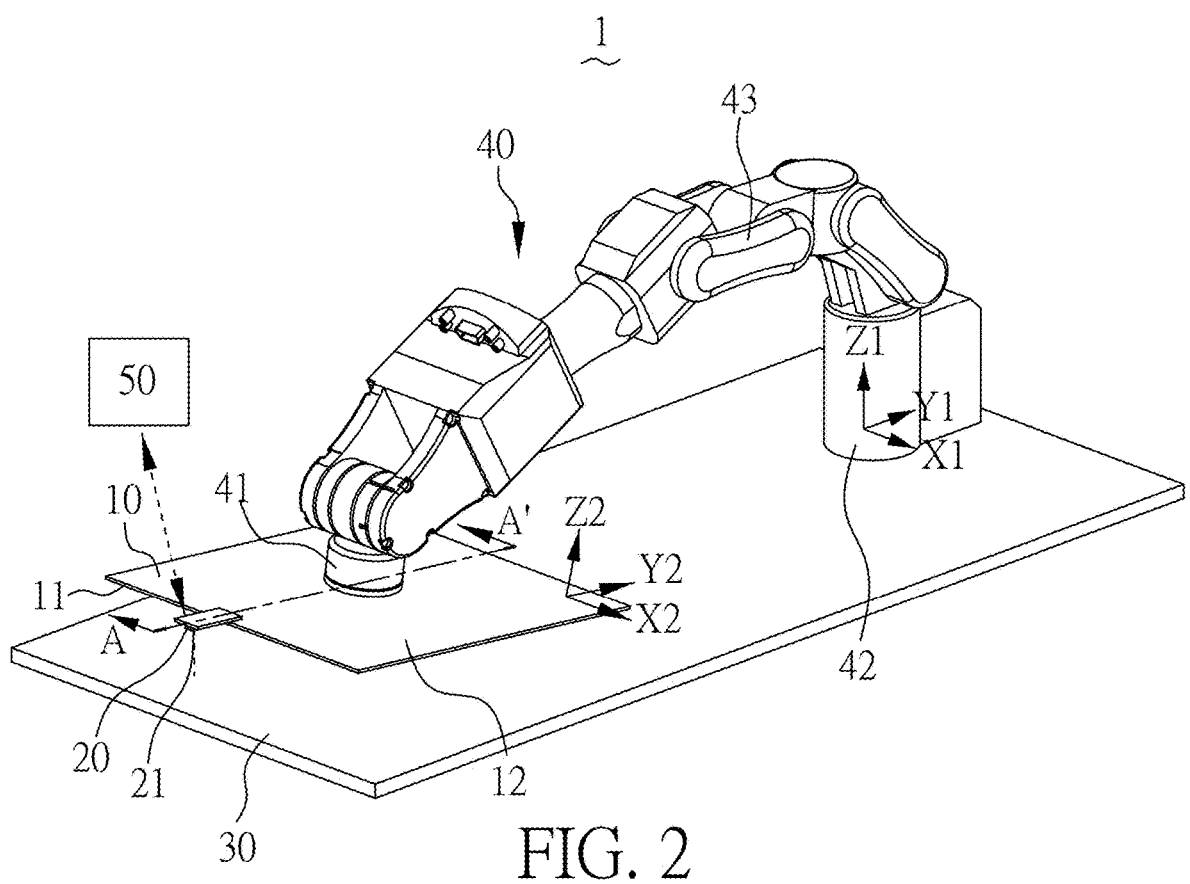
FIG. 2 is a detailed schematic diagram of an assembling device according to an embodiment of the present disclosure.

FIG. 2 is a detailed schematic diagram of an assembling device 1 according to an embodiment of the present disclosure, and please refer to FIG. 1 at the same time. The assembling device 1 may perform the method of adjusting flatness of planes. By adjusting the angle of the pick-and-place mechanism 10, the flatness between the pick-and-place surface 11 of the pick-and-place mechanism 10 and the reference plane 30 is approximately the same. In other words, the pick-and-place surface 11 of the pick-and-place mechanism 10 is adjusted to be substantially parallel to the reference plane 30.

As shown in FIG. 2, the pick-and-place mechanism 10 further includes a distance sensor 20, and part of the distance sensor 20 may be arranged on a second surface 12 of the pick-and-place mechanism 10, wherein the second surface 12 is opposite to the pick-and-place surface 11, and the remaining part of the distance sensor 20 may be exposed outside the second surface 12. The distance sensor 20 may include a sensing unit 21, wherein the sensing unit 21 may be exposed outside the second surface 12 and faces the reference plane 30. In one embodiment, the sensing unit 21 may be, for example, an optical sensing element, an ultrasonic sensing element, a laser sensing element, etc., which can measure the linear distance between two objects, while it is not limited thereto. The sensing unit 21 of the distance sensor 20 may measure the distance between the pick-and-place mechanism 10 and the reference surface 30 in the normal direction of the reference surface 30 (such as the Z1 axis), hereinafter referred to as the distance between the pick-and-place mechanism 10 and the reference surface 30.

With the driving of the rotation part 41, the pick-and-place mechanism 10 may rotate clockwise or counterclockwise around the Z2 axis of the second coordinate system and, based on the rotation of the pick-and-place mechanism 10, the distance sensor 20 may measure the distance between the pick-and-place mechanism 10 and the reference plane 30 at multiple positions (or in different directions corresponding to the rotation part 41). Furthermore, if the flatness between the pick-and-place surface 11 and the reference plane 30 is not in consistency, the distances between the pick-and-place mechanism 10 and the reference plane 30 measured by the distance sensor 20 in different directions are also not in consistency, which will be described in detail with reference to FIG. 3 and FIG. 4A in the subsequent paragraphs.

In addition, the assembling device 1 may further include a processing unit 50. The processing unit 50 may calculate the angle to be adjusted (i.e., the adjustment angle) for the pick-and-place mechanism 10 according to at least two distances between the pick-and-place mechanism 10 and the reference surface 30 measured by the distance sensor 20, and adjust the pick-and-place mechanism 10 according to the calculation result of the adjustment angle, so that the pick-and-place surface 11 is parallel to the reference plane 30. In one embodiment, the processing unit 50 may be, for example, a processor or a computer, and may implement its functions by executing computer programs or instructions in a non-transitory computer readable medium, such as calculating the adjustment angle of the pick-and-place mechanism 10. In one embodiment, the processing unit 50 may be arranged in an external device coupled to the distance sensor 20 and the robotic arm 40, such as but not limited to a computer. In another embodiment, the processing unit 50 may also be arranged in the robotic arm 40 and coupled to the distance sensor 20, while it is not limited thereto. In another embodiment, the processing unit 50 may also be arranged in the distance sensor 20 and coupled to the robotic arm 40, while it is not limited thereto.

Figure 3:
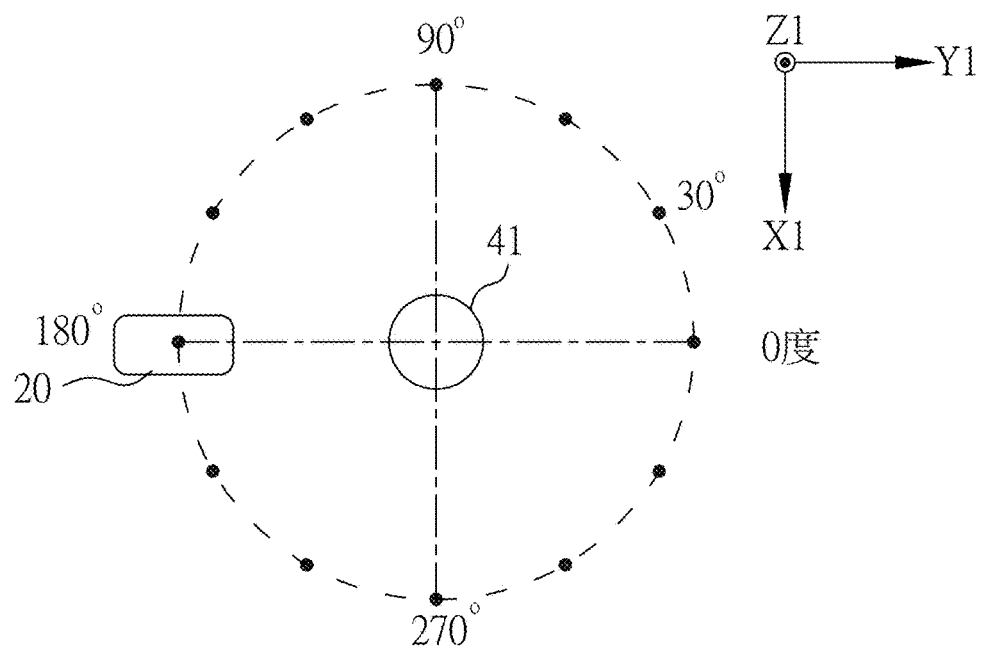
FIG. 3 is a schematic diagram of a distance sensor performing measurements in different directions according to an embodiment of the present disclosure.
Figure 4A:
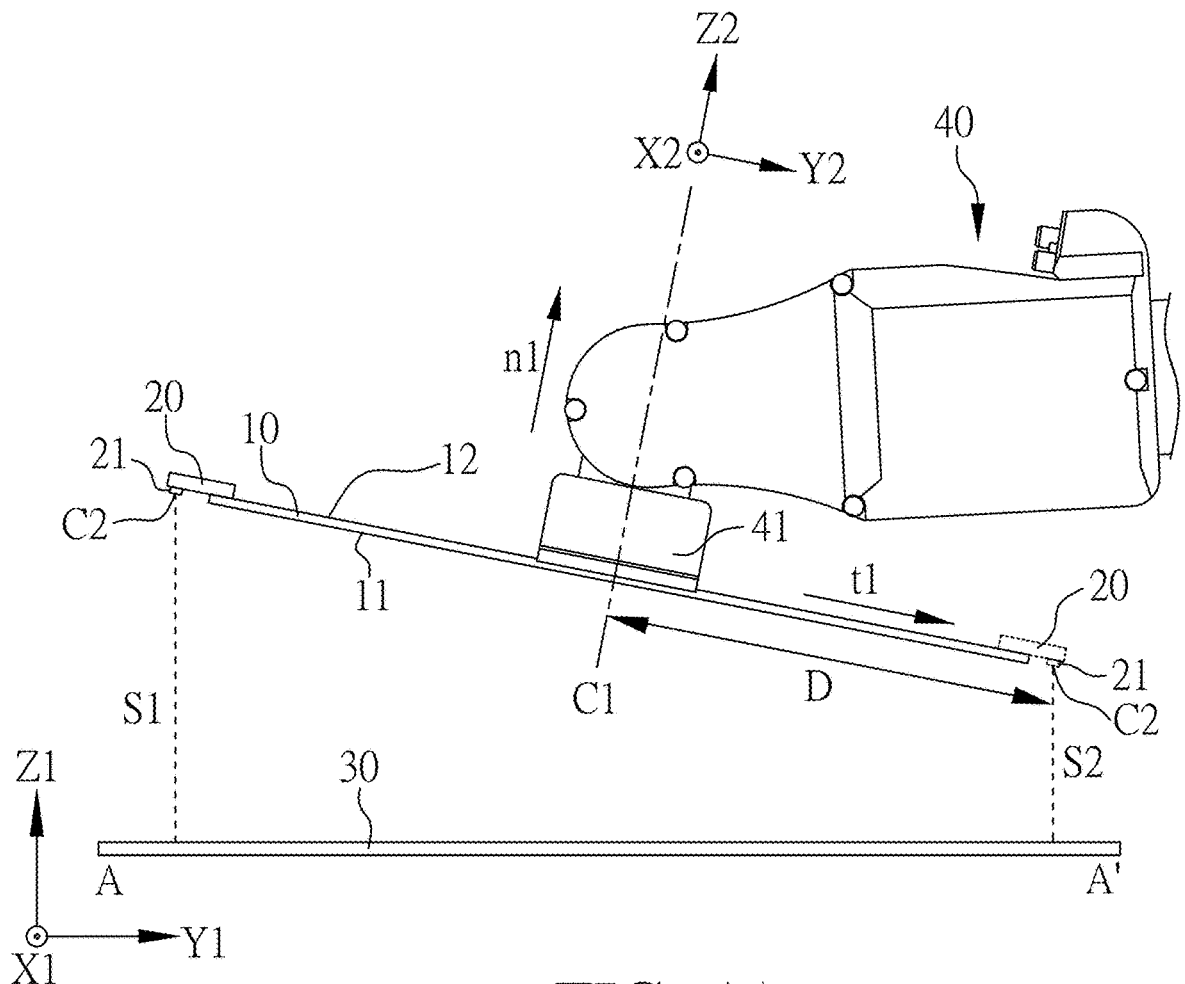
FIG. 4A schematically illustrates an offset angle of a pick-and-place mechanism according to an embodiment of the present disclosure.
Figure 4B:
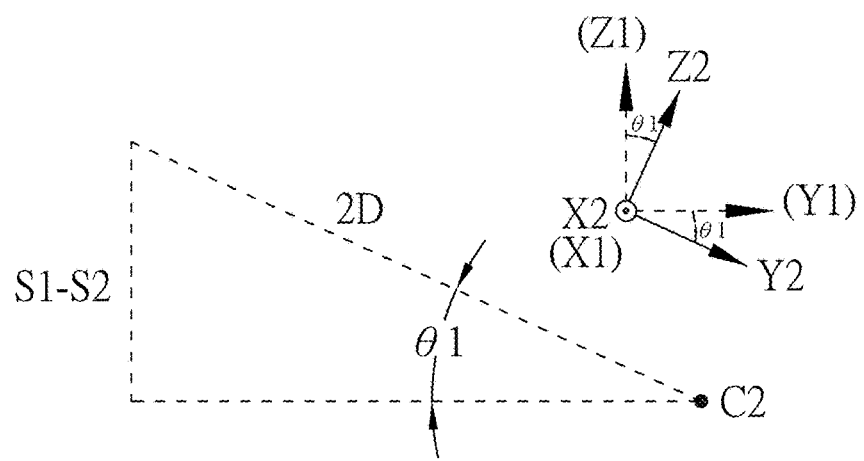
FIG. 4B schematically illustrates the calculation of an offset angle according to an embodiment of the present disclosure.

Next, the operation process of the distance sensor 20 and the processing unit 50 will be described with reference to FIG. 3 to FIG. 4B, and please refer to FIG. 1 and FIG. 2 at the same time. FIG. 3 is a schematic diagram of the distance sensor 20 performing measurements in different directions according to an embodiment of the present disclosure, which is presented in a top view. FIG. 4A is a cross-sectional view of the assembling device of FIG. 2 taken along line AA', which is used to show the offset angle of the pick-and-place mechanism 10. FIG. 4B schematically illustrates the calculation of an offset angle according to an embodiment of the present disclosure.

As shown in FIG. 3, the pick-and-place mechanism 10 rotates 360 degrees clockwise or counterclockwise around the Z2 axis of the second coordinate system, and the movement trajectory of the distance sensor 20 may be projected on a horizontal plane formed by the X1 axis and the Y1 axis of the first coordinate system; that is, FIG. 3 may be regarded as the projection of the movement trajectory of the distance sensor 20 on the horizontal plane formed by the X1 axis and the Y1 axis. In FIG. 3, the Y1 axis of the first coordinate system is, for example, corresponding to the orientation of 0 degrees, and the X1 axis is, for example, corresponding to the orientation of 270 degrees, but it is not limited thereto. In addition, the projection of the Y2 axis of the second coordinate system on the horizontal plane formed by the X1 axis and the Y1 axis is also corresponding to 0 degrees, and the X2 axis is corresponding to the orientation of 270 degrees. The distance sensor 20 may be set to measure at a fixed interval angle. For example, in the embodiment of FIG. 3, a fixed interval angle of 30 degrees is taken as an example so that the distance sensor may measure the distance corresponding to the Z1 axis between the pick-and-place mechanism 10 and the reference plane 30 distance (that is, the distance is parallel to the Z1 axis) in 12 directions including 0 degrees, 30 degrees, 60 degrees, 90 degrees, 120 degrees, 150 degrees, 180 degrees, 210 degrees, 240 degrees, 270 degrees, 300 degrees and 330 degrees. In one embodiment, the fixed interval angle may be, for example but not limited to, between 0.1 degrees and 45 degrees (that is, $0.1° \leq$ fixed interval angle $\leq 45°$), so that the fixed interval angle may be, for example, 45 degrees, 40 degrees, 30 degrees, 20 degrees, 10 degrees, 5 degrees, 1 degree, 0.5 degrees, 0.1 degrees, etc., while it is not limited thereto.

As shown in FIG. 3 and FIG. 4A, after the distance sensor 20 performs measurements in the aforementioned different directions, the processing unit 50 may set a maximum distance among all the measured distances corresponding to the Z1 axis as a first distance S1, and set the direction corresponding to the first distance S1 as the first direction. In addition, the processing unit 50 may set the distance measured in the opposite direction of the first direction as a second distance S2, wherein the first distance S1 is greater than or equal to the second distance S2 (that is, S2≤S1). By taking the embodiment of FIG. 3 as an example, when the distance measured by the distance sensor 20 in the direction of 180 degrees is assumed to be the first distance S1 (that is, the maximum distance), the direction of 180 degrees may be set as the first direction, and a distance measured in a direction opposite to the first direction (for example, a direction of 0 degrees) may be set as the second distance S2. In addition, as shown in FIG. 4A, the processing unit 50 may obtain an interval distance D between the distance sensor 20 and the center of the pick-and-place mechanism 10, wherein the interval distance D may be defined as the distance between the center C2 of the sensing unit 21 of the distance sensor 20 and the center C1 of the pick-and-place mechanism 10 (or the center of the rotation part 41) in the horizontal direction of the pick-and-place surface 11. In one embodiment, the interval distance D may be a preset value or a known value, which is pre-input into the processing unit 50, but it is not limited thereto.

Next, please refer to FIG. 2 to FIG. 4A at the same time. The cross-section of FIG. 4A may be generated, and the cross section of FIG. 4A may correspond to the AA' section line in FIG. 2, wherein the AA' section line in FIG. 2 is the extension of the connection line of a certain direction on the movement trajectory of the distance sensor 20 in FIG. 3 (for example, the direction corresponding to the first distance S1) and the direction opposite to the certain direction, such as the extension of the connection line of the direction of 180 degrees and the direction of 0 degrees in FIG. 3, that is, the extension of the connection line of the orientation of the first distance S1 to the orientation of the second distance S2, while it is not limited thereto. In addition, as shown in FIG. 4A, the pick-and-place surface 11 has a tangent projection direction t1 and a normal projection direction n1 on the cross section.

In one embodiment, after the processing unit 50 finds out the orientations of the first distance S1 and the second distance S2, the processing unit 50 may generate the cross-section of FIG. 4A and convert the cross-section to the second coordinate system. In the conversion, for example, the normal line of the cross-section is set as the X2 axis of the second coordinate system so that the cross-section faces the X2 axis, the tangent projection direction t1 of the pick-and-place surface 11 in the cross-section is set as the Y2 axis of the second coordinate system, and the normal projection direction n1 of the pick-and-place surface 11 in the cross-section is set as the Z2 axis of the second coordinate system. At this moment, there may be an offset angle between the Z2 axis of the second coordinate system and the Z1 axis of the first coordinate system, and there may be an offset angle between the Y2 axis of the second coordinate system and the Y1 axis of the first coordinate system. The offset angle between the Z2 axis and the Z1 axis may be equal to the offset angle between the Y2 axis and the Y1 axis. The offset angle is, for example, a first compensation angle $\theta_1$. It is noted that, when the angle corresponding to the first distance S1 is 180 degrees, the normal line of the cross-section itself may be regarded as the X2 axis, so that there is no need to perform coordinate system conversion. However, when the angle corresponding to the first distance S1 is not 180 degrees (for example, 90 degrees in FIG. 3), the normal line of the section formed at this orientation is not parallel to the X2 axis, so that the processing unit 50 has to transfer the cross-section to the second coordinate system, and so on.

Next, as shown in FIG. 4A and FIG. 4B, the processing unit 50 may calculate a first compensation angle $\theta_1$ of the pick-and-place mechanism 10 according to the first distance S1, the second distance S2 and the interval distance D. In one embodiment, the first distance S1, the second distance S2, the interval distance D and the first compensation angle θ₁ satisfy the following relationship:

$$\theta_1 = \sin^{-1}\left(\frac{(S1-S2)}{2D}\right),$$

where S1 represents the first distance, S2 represents the second distance, D represents the interval distance, and θ₁ represents the first compensation angle. In comparison with the prior art, the present disclosure may accurately obtain the compensation angle required for the pick-and-place mechanism 10, thereby improving the accuracy of adjustment.

Then, the processing unit 50 may control the robotic arm 40 to adjust the pick-and-place mechanism 10 according to the first compensation angle θ₁ so as to adjust the flatness between the pick-and-place surface 11 and the reference plane 30. It is noted that, before the adjustment, the pick-and-place surface 11 of the pick-and-place mechanism 10 and the reference plane 30 may not be parallel, that is, the pick-and-place surface 11 and the reference plane 30 will correspond to different coordinate systems. Therefore, the robotic arm 40 may adjust the angle of the pick-and-place mechanism 10 according to the first compensation angle θ₁, so that the pick-and-place mechanism 10 may rotate around the X2 axis (that is, the X1 axis). The angle of rotation may be, for example, the first compensation angle θ₁, thereby adjusting the flatness between the pick-and-place surface 11 and the reference surface 30. In one embodiment, "adjusting the flatness" may be, for example, adjusting the normal projection direction n1 (such as the Z2 axis of the second coordinate system) of the pick-and-place surface 11 on the cross-section to be parallel to the Z1 axis of the first coordinate system, and adjusting the tangent projection direction t1 (such as the Y2 axis of the second coordinate system) of the pick-and-place surface 11 on the cross-section to be parallel to the Y1 axis of the first coordinate system. By analogy, the way to adjust the flatness in other directions can be known.

Figure 5:
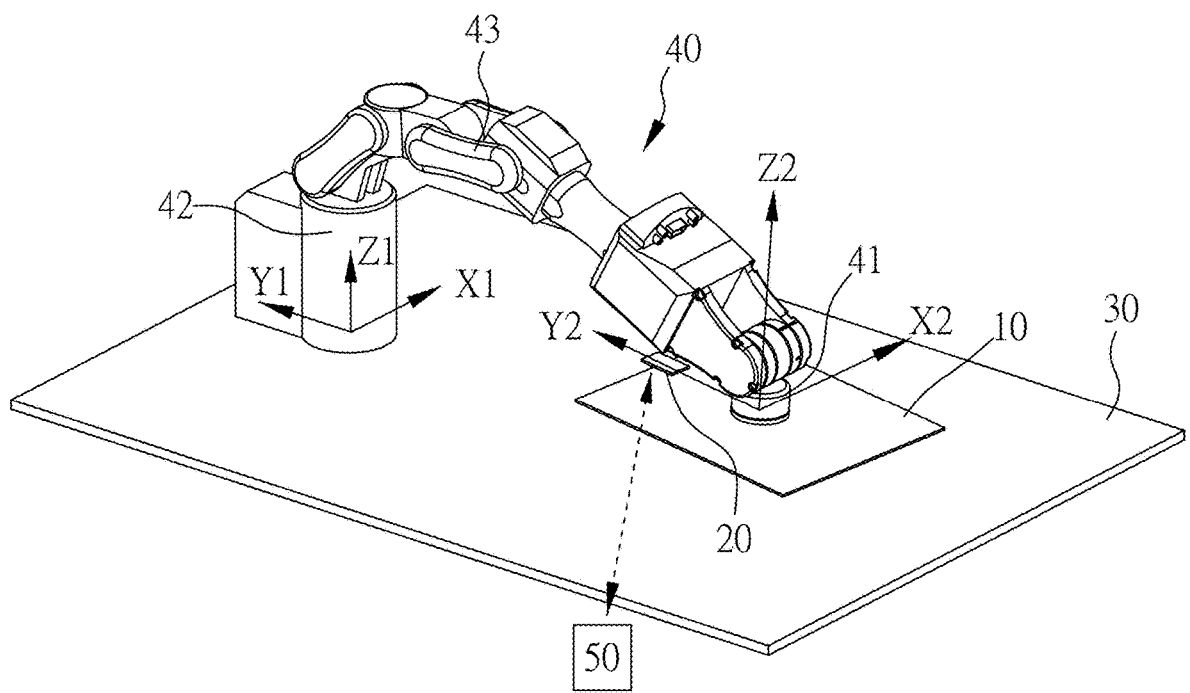
FIG. 5 is a schematic diagram of a first coordinate system and a second coordinate system according to an embodiment of the present disclosure.

Next, please refer to FIG. 3 and FIG. 5 at the same time, wherein FIG. 5 is a schematic diagram of the first coordinate system and the second coordinate system of an embodiment of the present disclosure, and please also refer to FIG. 1, FIG. 2, FIG. 4A and FIG. 4B as an aid.

As shown in FIGS. 3 and 5, the movement trajectory of the distance sensor 20 when rotating 360 degrees around the Z2 axis is projected to the first coordinate system, and thus the coordinate system used when calculating the first compensation angle θ₁ may be the first coordinate system. In addition, the coordinate system used by the robotic arm 40 to adjust the pick-and-place mechanism 10 according to the first compensation angle θ₁ may be the second coordinate system.

Next, the details of the method for adjusting flatness of planes performed by the assembling device 1 will be described.

First, the method for adjusting flatness of planes of the first embodiment will be described. Please refer to FIG. 3 to FIG. 4B again. In one embodiment, after the robotic arm 40 adjusts the orientation of the pick-and-place mechanism 10 in the first direction according to the first compensation angle θ₁, that is, after the flatness in the first direction corresponding to the maximum distance between the pick-and-place surface 11 and the reference plane 30 is adjusted, the processing unit 50 may find another maximum distance among the distances measured in other directions (for example, the next largest distance smaller than the maximum distance in the first direction), and perform calculation of compensation angle on the direction corresponding to the second largest distance according to the aforementioned method (for example, the description of FIG. 4A and FIG. 4B). Then, the robotic arm 40 performs flatness adjustment on the pick-and-place mechanism 10 according to the compensation angle corresponding to the second largest distance. The above process is repeated until the adjustments for all directions are completed.

Figure 6:
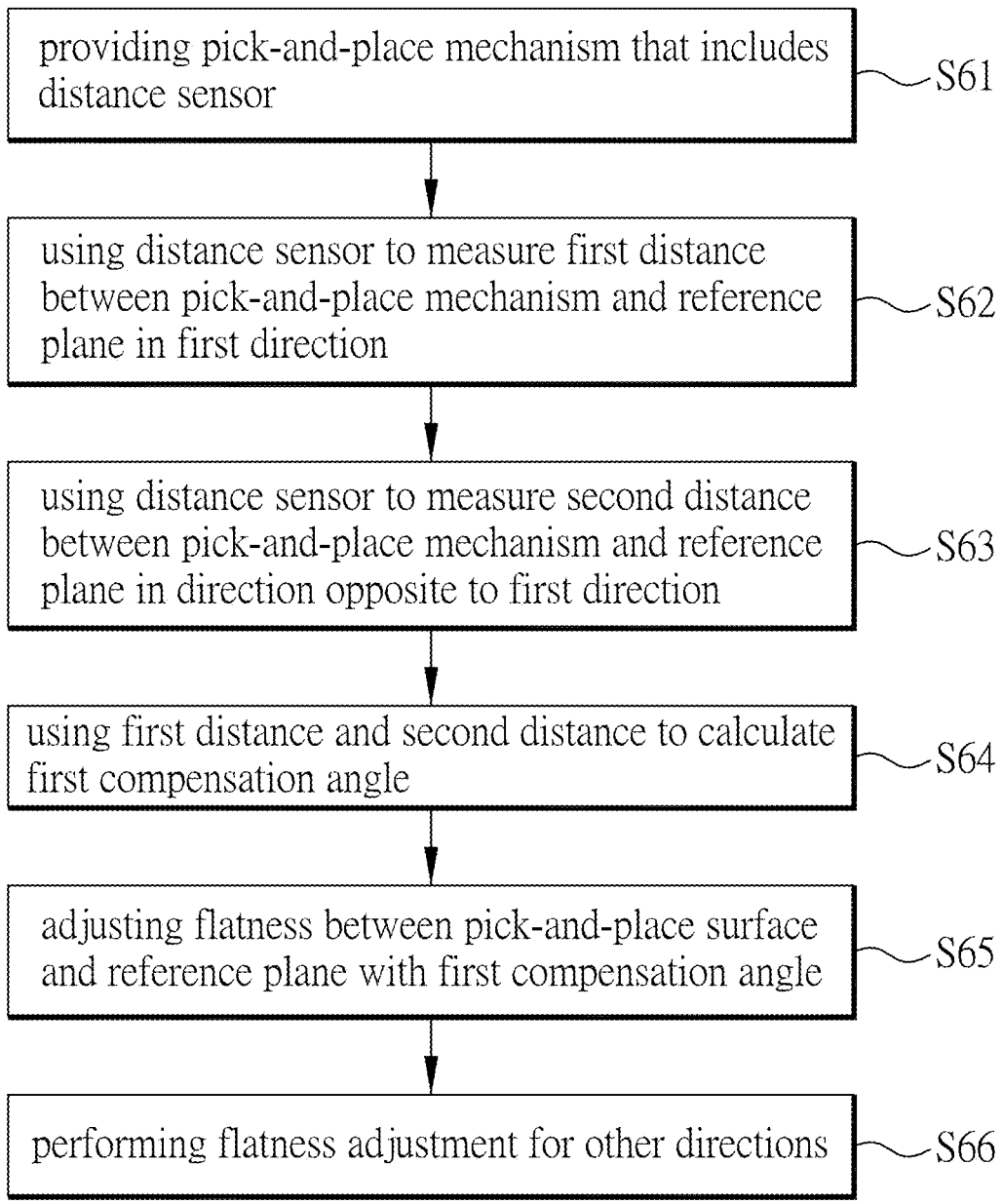
FIG. 6 is a flow chart illustrating the steps of the method for adjusting flatness of planes according to the first embodiment of the present disclosure.

With the features of the above components, the assembling device 1 may perform the method for adjusting flatness of planes of the first embodiment. FIG. 6 is a flow chart illustrating the steps of the method for adjusting flatness of planes according to the first embodiment of the present disclosure, and please refer to FIGS. 1 to 5 at the same time.

As shown in FIG. 6, step S61 is first executed to provide the pick-and-place mechanism 10, wherein the pick-and-place mechanism 10 includes a distance sensor 20. Then, step S62 is executed to use the distance sensor 20 to measure the first distance S1 between the pick-and-place mechanism 10 and the reference surface 30 in the first direction, wherein the distance sensor 20 may first measure multiple distances in multiple directions, then set the direction of the maximum distance among the measured distances as the first direction, and set the maximum distance as the first distance S1. Then, step S63 is executed to use the distance sensor 20 to measure the second distance S2 between the pick-and-place mechanism 10 and the reference surface 30 in the direction opposite to the first direction. Then, step S64 is executed to use the first distance S1 and the second distance S2 to calculate the first compensation angle θ₁. Then, step S65 is executed to adjust the flatness between the pick-and-place surface 11 and the reference surface 30 with the first compensation angle θ₁. Then, step S66 is executed to perform flatness adjustment for other directions. For example, step S62 to step S65 may be executed again for the measurement results of the distance sensor 20 in other directions until completing flatness adjustment for all the measured directions.

As a result, the method for adjusting flatness of planes of the first embodiment can be understood.

Next, the method for adjusting flatness of planes of the second embodiment will be described. Please refer to FIG. 3 to FIG. 4B again. In another embodiment, after the robotic arm 40 adjusts the angle of the pick-and-place mechanism 10 according to the first compensation angle θ₁, that is, after the adjustment of the first direction corresponding to the maximum distance is completed, the processing unit 50 may obtain a third distance in a second direction perpendicular to the first direction, and a fourth distance in a direction opposite to the second direction, wherein the third distance is greater than or equal to the fourth distance. In other words, when the first direction is 180 degrees, the second direction is 270 degrees or 90 degrees, the third distance is the distance corresponding to the Z1 axis between the pick-and-place mechanism 10 and the reference plane 30 measured by the distance sensor 20 in the second direction, and the fourth distance is the distance corresponding to the Z1 axis between the pick-and-place mechanism 10 and the reference plane 30 measured by the distance sensor 20 in the direction opposite to the second direction. In one embodiment, the difference between the first distance S1 and the second distance S2 (i.e., S1-S2) is greater than or equal to the difference between the third distance and the fourth distance, but it is not limited thereto. It is noted that those skilled in the art may deduce the aspects of the third distance, the fourth distance and the second compensation angle from the examples shown in FIG. 3 to FIG. 4B, so that the third distance, the fourth distance and second compensation angle are not presented in the figures.

Then, the processing unit 50 calculates a second compensation angle according to the third distance, the fourth distance and the interval distance D. In one embodiment, the third distance, the fourth distance, the interval distance and the second compensation angle satisfy the following relationship:

$$\theta_2 = \sin^{-1}\left(\frac{(S3 - S4)}{2D}\right),$$

where S3 represents the third distance, S4 represents the fourth distance, D represents the interval distance, and $\theta_2$ represents the second compensation angle.

Then, the robotic arm 40 adjusts the flatness between the reference plane 30 and the pick-and-place surface 11 of the pick-and-place mechanism 10 in the second direction according to the second compensation angle.

In addition, in one embodiment, the processing unit 50 may also first calculate the first compensation angle $\theta_1$ and the second compensation angle, and then simultaneously adjust the flatness between the reference plane 30 and the pick-and-place surface 11 of the pick-and-place mechanism 10 in the first direction and the second direction.

Figure 7:
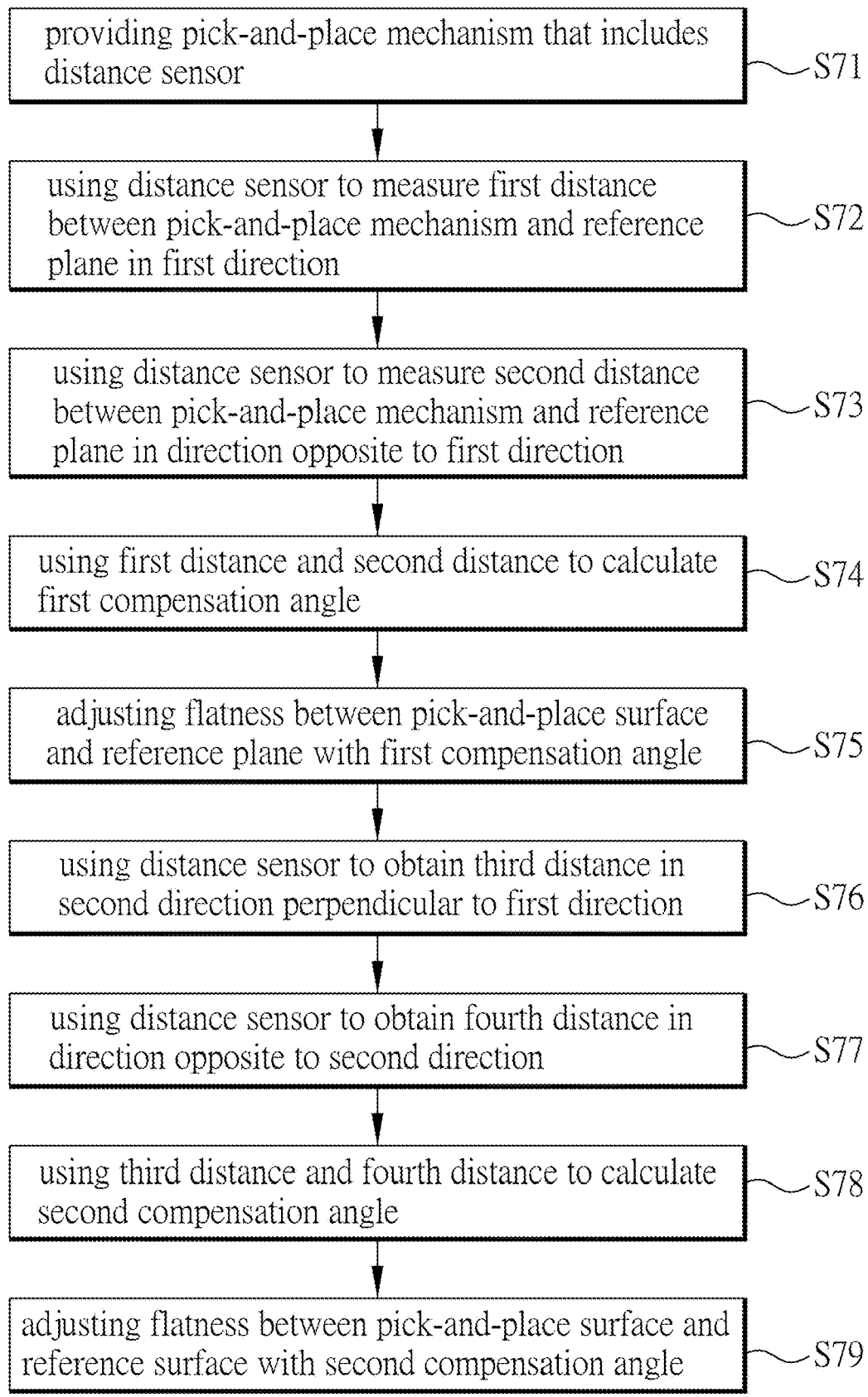
FIG. 7 is a flow chart illustrating the steps of the method for adjusting flatness of planes according to the second embodiment of the present disclosure.

With the features of the above components, the assembling device 1 may perform the method for adjusting flatness of planes of the second embodiment. FIG. 7 is a flow chart illustrating the steps of the method for adjusting flatness of planes according to the second embodiment of the present disclosure, and please refer to FIG. 1 to FIG. 5 at the same time.

As shown in FIG. 7, step S71 is first executed to provide the pick-and-place mechanism 10, wherein the pick-and-place mechanism 10 includes a distance sensor 20. Then, step S72 is executed to use the distance sensor 20 to measure the first distance S1 between the pick-and-place mechanism 10 and the reference surface 30 in the first direction, wherein the distance sensor 20 may measure multiple distances in multiple directions first, set the direction of the maximum distance among the measured distances as the first direction, and set the maximum distance as the first distance S1. Then, step S73 is executed to use the distance sensor 20 to measure the second distance S2 between the pick-and-place mechanism 10 and the reference surface 30 in the direction opposite to the first direction. Then, step S74 is executed to use the first distance S1 and the second distance S2 to calculate the first compensation angle $\theta_1$. Then, step S75 is executed to use the first compensation angle $\theta_1$ to adjust the flatness between the pick-and-place surface 11 and the reference surface 30. Then, step S76 is executed to use the distance sensor 20 to measure a third distance between the pick-and-place mechanism 10 and the reference surface 30 in a second direction perpendicular to the first direction. Then, step S77 is executed to use the distance sensor 20 to measure a fourth distance between the pick-and-place mechanism 10 and the reference surface 30 in a direction opposite to the second direction, wherein the third distance is greater than or equal to the fourth distance. Then, step S78 is executed to use the third distance and the fourth distance to calculate the second compensation angle. Then, step S79 is executed to adjust the flatness between the pick-and-place surface 11 and the reference surface 30 with the second compensation angle $\theta_2$.

As a result, after using the first compensation angle $\theta_1$ and the second compensation angle to adjust the flatness between the pick-and-place surface 11 and the reference plane 30, the flatness between the pick-and-place surface 11 and the reference plane 30 may approach to be consistent. Therefore, the second embodiment may also mitigate the problems of the prior art and improve the efficiency.

In addition, in the method for adjusting flatness of planes of the second embodiment, when the flatness adjustment based on the first compensation angle $\theta_1$ is completed (for example, after steps S74 to S75 are completed), it starts the calculation of the second compensation angle and the adjustment of flatness (such as steps S76 to S77). However, in another embodiment, it may first calculate the first compensation angle $\theta_1$ and the second compensation angle in sequence, then use the first direction, the first compensation angle, the second direction and the second compensation angle to calculate a third direction and a third compensation angle, and perform a one-time angle adjustment, thereby saving more adjustment time.

In one embodiment, the present disclosure may at least compare the assembling device 1 with an object through mechanism observation to determine whether the object falls under the patent protection of the present disclosure by the presence or absence of components and/or the configuration of the components, while it is not limited thereto.

Accordingly, the assembling device 1 of the present disclosure may perform the method for adjusting flatness of planes of the first embodiment, and may automatically detect whether flatness exists between the pick-and-place surface 11 of the pick-and-place mechanism 10 and the reference plane 30. Alternatively, the present disclosure may perform adjustments automatically. Therefore, it is able to greatly reduce the defect that manpower is used for observation and adjustment in the prior art.

The details or features of the various embodiments disclosed in the present disclosure may be mixed and matched arbitrarily as long as they do not violate the spirit of the present disclosure or conflict with each other.

The aforementioned specific embodiments should be construed as merely illustrative, and not limiting the rest of the present disclosure in any way.

The invention claimed is:

1. A method for adjusting flatness of planes, comprising the steps of:
   providing a pick-and-place mechanism, wherein the pick-and-place mechanism includes a distance sensor and a pick-and-place surface;
   using the distance sensor to measure a first distance between the pick-and-place mechanism and a reference plane in a first direction;
   using the distance sensor to measure a second distance between the pick-and-place mechanism and the reference plane in a direction opposite to the first direction;
   using the first distance and the second distance to calculate a first compensation angle; and
   adjusting flatness between the pick-and-place surface and the reference plane with the first compensation angle.

2. The method as claimed in claim 1, wherein there is an interval distance between the distance sensor and a center of the pick-and-place mechanism, the first distance is greater than or equal to the second distance, and the first distance, the second distance, the interval distance and the first compensation angle satisfy:

$$\theta_1 = \sin^{-1}\left(\frac{(S1 - S2)}{2D}\right),$$

where S1 represents the first distance, S2 represents the second distance, D represents the interval distance, and $\theta_1$ represents the first compensation angle.

3. The method as claimed in claim 2, wherein the pick-and-place mechanism is arranged on a robotic arm.

4. The method as claimed in claim 3, wherein the robotic arm is fixed on the reference surface.

5. The method as claimed in claim 4, wherein the first compensation angle corresponds to a coordinate system of the robotic arm.

6. The method as claimed in claim 2, further comprising the steps of:
using the distance sensor to obtain a third distance in a second direction perpendicular to the first direction, and a fourth distance in a direction opposite to the second direction; and
using the third distance and the fourth distance to calculate a second compensation angle.

7. The method as claimed in claim 6, wherein the third distance is greater than or equal to the fourth distance, and the third distance, the fourth distance and the second compensation angle satisfy:

$$\theta_2 = \sin^{-1}\left(\frac{(S3 - S4)}{2D}\right),$$

where S3 represents the third distance, S4 represents the fourth distance, D represents the interval distance, and $\theta_2$ represents the second compensation angle.

8. The method as claimed in claim 6, wherein a difference between the first distance and the second distance is greater than or equal to a difference between the third distance and the fourth distance.

9. The method as claimed in claim 1, wherein the pick-and-place mechanism is used to pick and place a panel, and the reference plane is used to place a backlight module.

10. The method as claimed in claim 1, wherein the first distance is a maximum distance among a plurality of distances between the pick-and-place mechanism and the reference surface measured by the distance sensor in a plurality of directions.

11. The method as claimed in claim 6, further comprising the step of: adjusting the flatness between the pick-and-place surface and the reference surface with the second compensation angle.

12. The method as claimed in claim 1, wherein the reference plane is larger than the pick-and-place plane.

13. The method as claimed in claim 3, wherein the robotic arm includes a rotation part, a base and at least one connection part for connecting the base and the rotation part.

14. The method as claimed in claim 13, wherein the rotation part is connected to the pick-and-place mechanism.

15. The method as claimed in claim 13, wherein the base is arranged and fixed on the reference plane.

16. The method as claimed in claim 13, wherein the base is arranged on a horizontal plane, which is parallel to the reference plane and at a level different from that of the reference plane.

17. The method as claimed in claim 1, wherein part of the distance sensor is arranged on a surface of the pick-and-place mechanism that is opposite to the pick-and-place surface, and remaining part of the distance sensor is exposed outside the surface.

18. The method as claimed in claim 17, wherein the distance sensor comprises a sensing unit, wherein the sensing unit is exposed outside the second surface and faces the reference plane.

19. The method as claimed in claim 3, wherein the robotic arm adjusts an angle of the pick-and-place mechanism according to the first compensation angle, and rotates the pick-and-place mechanism by the first compensation angle so as to adjust flatness between the pick-and-place surface and the reference surface.

20. The method as claimed in claim 1, wherein the first compensation angle is calculated by a processing unit.

* * * * *